United States Patent Office 3,620,082
Patented Nov. 16, 1971

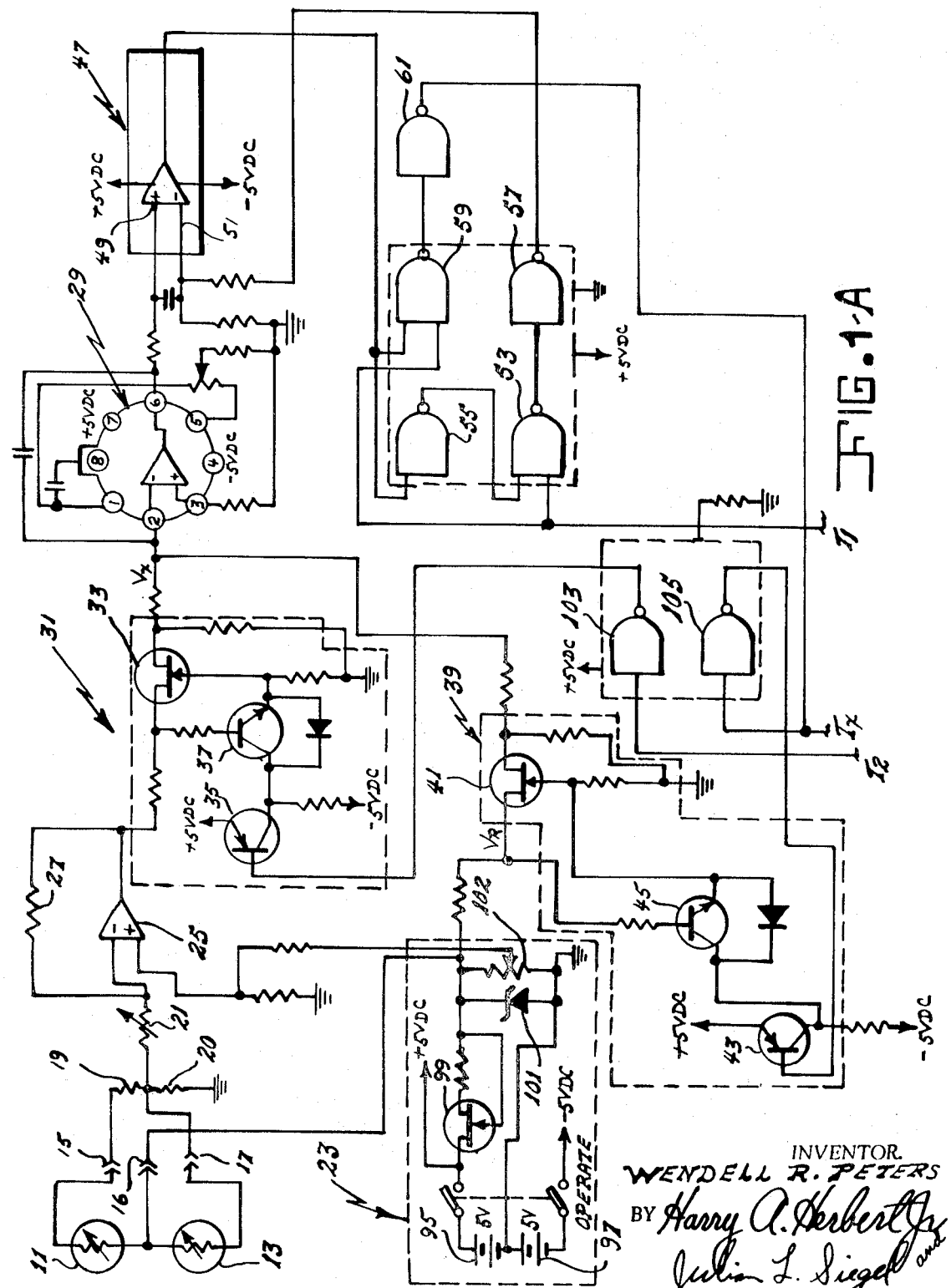
FIG.1-A
INVENTOR.
WENDELL R. PETERS
BY Harry A. Herbert Jr
Julian L. Siegel and
ATTORNEYS

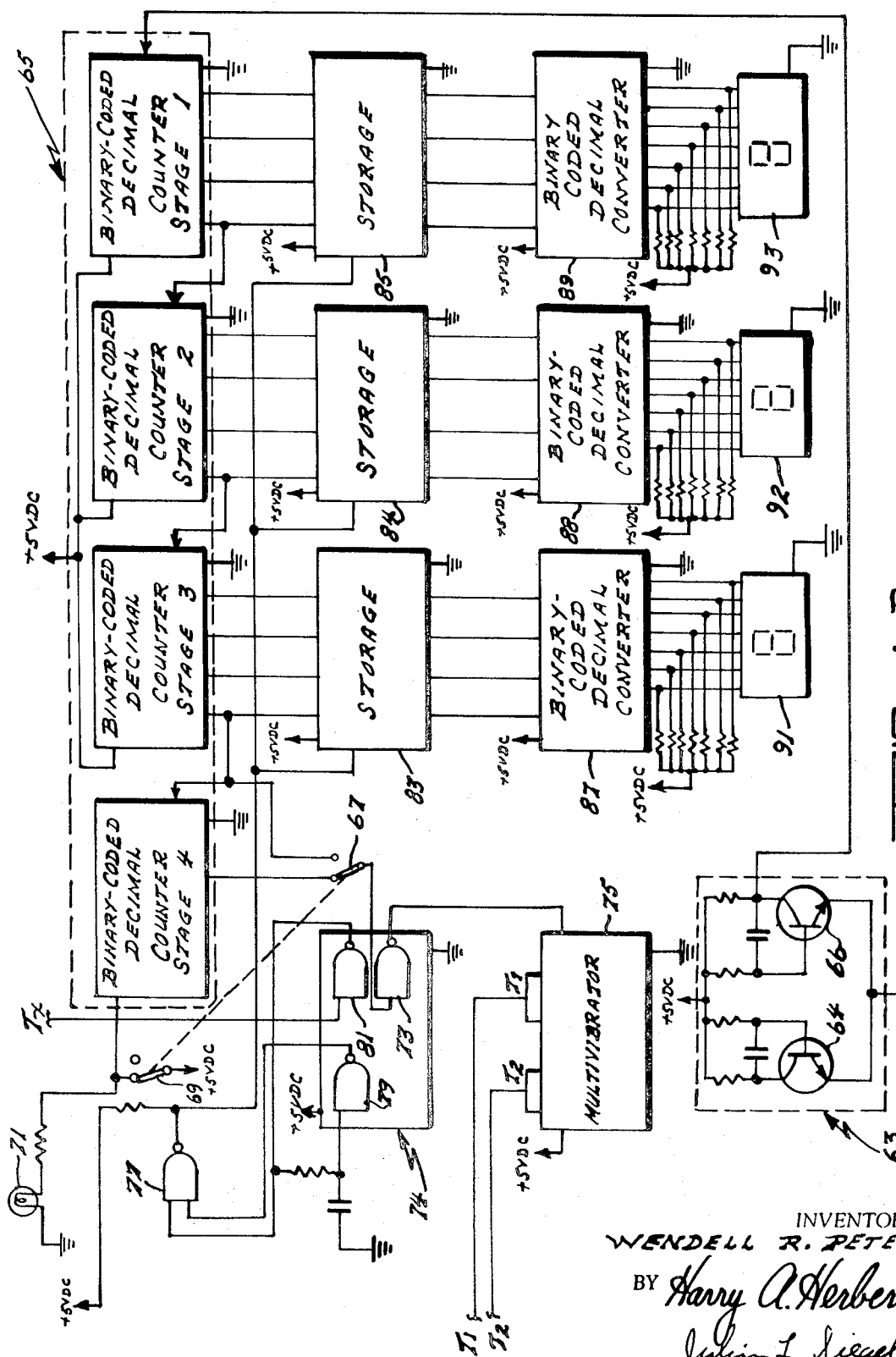

3,620,082
DIGITAL THERMOMETER
Wendell R. Peters, San Antonio, Tex., assignor to the
United States of America as represented by the Secretary of the Air Force
Filed Mar. 13, 1970, Ser. No. 19,181
Int. Cl. G01d 5/245, 5/252; G01k 7/24
U.S. Cl. 73—362 AR                                   3 Claims

ABSTRACT OF THE DISCLOSURE

Through a thermistor probe, temperature is converted into a voltage which is integrated for a fixed period of time following which a reference voltage is reverse integrated until the value in the integrator is zero. During the reverse integration a counter operates and upon completion of the reverse integration the value in the counter is converted into a decimal readout indicative of temperature. The counter triggers multivibrator circuits which produce timing pulses for activating switches that control the input to the integrator from the thermistor controlled voltage source and the reference voltage source.

BACKGROUND OF THE INVENTION

This invention relates to temperature measuring devices, and more particularly to a digital thermometer.

Mercury type glass thermometers are unsuitable for manned space flight because of the danger of breakage and the resulting mercury contamination of the closed environment. The invention provides a clinical quality oral temperature measurement without these hazards. A numerical readout reduces the possibility of error in reading the temperature.

The digital thermometer can be built as a miniature all-electronic instrument that displays the numeric readout in degrees of the temperature sensed by an unbreakable thermistor probe. The unit's small size, light weight, and self-contained rechargeable batteries make it completely portable and independent of external power sources. A number of interchangeable thermistor probes are available which allow it to be adapted for temperature measurements in vivo, liquids, solids, and gases. Power is applied to the unit when a push-to-read switch is activated and the correct reading is obtained immediately with no warm-up required.

While the invention can be used in support of manned space flight programs, other applications include clinical measurements on air evacuation flights or at any location where mercury thermometers present a problem and accurate measurements are needed. In an operating room it would provide continuous temperature measurements in vivo without the shock hazard associated with equipment which operates with the customary higher voltages.

An important use for the invention is taking oral temperature measurements. Other uses are finding hot spots in a motor suspected of overheating, locating abnormal temperature variations in an air conditioning system using an air temperature probe, and checking for heating in a headset receiver under overload conditions using a fast response bead probe.

SUMMARY OF THE INVENTION

The digital thermometer is a miniaturized, highly accurate, portable direct readout digital device with two temperature ranges. One temperature range can measure from 32 to 150 degrees Fahrenheit with an accuracy of one degree, the second range measures temperatures from 95 to 105 degrees with one-tenth of a degree accuracy. The unit is very light and can be powered with self-contained rechargeable silver zinc batteries providing many hours of continuous operation. The temperature sensor is a thermistor probe.

It is therefore an object of the invention to provide an electronic thermometer that offers a numeric readout which reduces the possibility of reading error and without the danger of breakage with accompanying mercury damage.

It is another object to provide a highly reliable digital thermometer having removable temperature sensing probes for use in various media.

It is still another object to provide a highly accurate portable direct readout digital thermometer having multiple temperature ranges.

These and other advantages, features and objects of the invention will become more apparent from the following description taken in connection with the illustrative embodiment in the accompanying drawings, wherein:

DESCRIPTION OF THE DRAWINGS

FIGS. 1a and 1b are circuit diagrams showing an embodiment of the invention.

DETAILED DESCRIPTION OF THE PREFERRED EMBODIMENT

The details of the invention are now discussed showing the construction and operation of the digital thermometer using off-the-shelf integrated circuits. However, it is understood that other similar components can be used within the scope of the invention.

Referring to FIG. 1a, thermistors 11 and 13 are the temperature sensitive elements and can be removed at junctions 15–17 if a different range is desired or a different media is used. The thermistor composite is available commercially, as an example, No. 44201 manufactured by Yellow Springs Instruments. Dependent on the temperature the voltage is developed across resistors 19, 20, and 21 with resistor 21 being a variable resistor for purposes of calibration. The voltage results due to the current generated by power supply 23 and is amplified by linear amplifier 25 using feedback resistor 27. The amplified voltage is fed to integrator 29 through series switch 31. An example of such an integrator is LM201 manufactured by National Semiconductor Company. Series switch 31 comprises field effect transistor 33 and transistors 35 and 37. A stable reference voltage $V_R$ is also fed to integrator 29 through series switch 39 comprising field effect transistor 41 and transistors 43 and 45.

The unknown voltage $V_X$ from the thermistors is integrated for a fixed period of time $T_1$ as controlled by switch 31. During this period the output of integrator 29 increases linearly with time. During a second period $T_2$ the reference voltage $V_R$ having opposite polarities to $V_X$ is integrated until the output of integrator 29 returns to zero. The time for the second integration $T_X$ is proportional to the unknown voltage from the thermistors. This process is known as up-down integration.

In order to determine when the output of integrator 29 is zero, it is fed to the non-inverting input of comparator 49. An example of such a comparator is NE526A manufactured by Signatics. The output of comparator 47 is high or a logic "1" for a positive input from integrator 29 and a low or logic "0" for a negative input. A NOR gate consisting of gate 53 and inverters 55 and 57 connects the positive feedback voltage to the inverting input 51 of comparator 47. Time pulse $T_1$ is also fed to gate 53. The feedback action of the NOR gate insures a definite switching action as the input passes through zero volts. The output of NAND gate 59 fed by comparator 47 and timing signal $T_1$ is low only during $T_X$, the time proportional to temperature and this output signal is inverted by inverter 61 to produce a signal that is high during time $T_x$.

In FIG. 1b there is a shown a stable multivibrator 63 comprising transistors 64 and 66 with the customary associated circuitry. For explanation purposes it is assumed multivibrator 63 provides a clock frequency of 30 kHz. which pulses binary-coded-decimal counter 65. This counter forms the master counter and generates either 0.33 millisecond time periods or .033 millisecond time periods, depending upon the position of switch 67 which takes as an output from stage 3 or stage 4. Switch 67 is ganged with switch 69 to control decimal point light 71 which appears in the proper place in the display. The time periods generated by control 65 are inverted by inverter 73 of logic circuit 74 and are processed by multivibrator circuit 75 into time periods $T_1$ and $T_2$. The outputs of master counter 65 represent the number "N" that increases linearly with time, starting with the leading edge of $T_x$.

The trailing edge of $T_x$ is converted into a trailing edge pulse by NAND circuit 77 and inverters 79 and 81 of logic circuit 74. This pulse transfers the contents of the master counter 65 into storage circuits 83 to 85 which represent the number "N." These storage circuits contain latch circuits and input gating and are commercially available.

The outputs of storage circuits 83 to 85 are coupled into a bank of converting circuits 87 to 89 which convert each binary-coded-decimal for input into numerical readout circuits 91 to 93. The readouts represented here are 7-light bar filament lights. As shown, if all seven bars are activated a figure 8 is presented. Such a readout is commercially available as Pinlite R3–20. Decimal point light 71 appears on the display between readout circuits 92 and 93 and is controlled by ganged range switches 67 and 69 as previously explained.

Power supply 23 as shown comprises batteries 95 and 97 together with field-effect transistor 99 to provide a constant current source to produce a stable voltage across Zener diode 101. For calibration purposes, a variable output of power supply 23 is available using potentiometer 102. Transistors 35 and 43 are coupled to inverters 103 and 105 to generate signals of proper polarity and amplitude to operate series switches 31 and 39.

I claim:
1. A digital thermometer comprising:
 (a) means for converting temperature to a temperature controlled voltage;
 (b) means for integrating the temperature controlled voltage for a predetermined time;
 (c) a source of reference voltage;
 (d) means for integrating the reference voltage until the integrated reference voltage equals the integrated temperature controlled voltage, the integrating means and the reference voltage integrating means including,
  (1) an integrator alternately fed by the temperature controlled voltage and the referred voltage, the reference voltage having a reversed polarity; and
  (2) a comparator fed by the integrator for determining zero voltage therein;
 (e) a counter;
 (f) means for pulsing the counter during the reference voltage integration; and
 (g) means for reading out the value of the counter.

2. A digital thermometer according to claim 1 which further comprises a multivibrator fed by the output of the counter for producing timing pulses controlling said predetermined time for temperature controlled voltage integration.

3. A digital thermometer according to claim 2 which further comprises a range switch interposed between the multivibrator and the outputs of the counter for selection thereof.

References Cited
UNITED STATES PATENTS

| | | | |
|---|---|---|---|
| 3,477,292 | 11/1969 | Thornton | 73—362 A |
| 3,311,842 | 3/1967 | Beck | 331—66 |

LOUIS R. PRINCE, Primary Examiner

F. SHOON, Assistant Examiner

U.S. Cl. X.R.

331—66